METHOD FOR THE FORMATION OF THIN FILMS

Filed April 1, 1964

INVENTOR.
ARNO K. HAGENLOCHER

BY R. J. Frank
ATTORNEY.

3,368,920

METHOD FOR THE FORMATION OF THIN FILMS

Arno K. Hagenlocher, Bayside, N.Y., assignor to General Telephone and Electronics Laboratories, Inc., a corporation of Delaware Filed Apr. 1, 1964, Ser. No. 356,603
6 Claims. (Cl. 117—221)

ABSTRACT OF THE DISCLOSURE

A method for forming a thin film of barium titanate, or other perovskite material, by simultaneously evaporating in the presence of oxygen two or more metal oxide constituents and depositing them on a heated substrate. A chemical reaction takes place between the constituents at substrate temperatures as low as 350° C. due to the presence of oxygen.

This invention relates to a method for forming thin films.

There is an increasing demand for electronic devices and circuits which are small, light, and extremely reliable. One approach to this problem involves the deposition of thin films of materials having the desired electrical characteristics on suitable substrates. Thin films, which may be defined as those having thicknesses up to one micron, have been deposited on substrates by vacuum or flash evaporation techniques but these processes are difficult to control and the films resulting from application of these techniques are not readily reproduced. In particular, efforts to deposit thin films of ferroelectric perovskite materials such as barium titanate ($BaTiO_3$) having dielectric constants in excess of 100 have not produced films exhibiting the desired chemical composition or electrical properties. (As defined in the text "Ferroelectric Crystals" by F. Jona and G. Shirane, Pergamon Press, 1962, page 216, the general formula of the compounds belonging to the perovskite family is $ABO_3$, where A is a monovalent, divalent or trivalent metal and B a pentavalent, tetravalent or trivalent element, respectively. The parent member of this family is the mineral $CaTiO_3$.) Also, it has been found that the formation of barium titanate from barium oxide and titanium dioxide by known methods requires temperatures in excess of 1300° C. As a result, the choice of substrate materials has been limited to those which can withstand relatively high temperatures thereby eliminating many otherwise satisfactory materials.

Accordingly, I have invented an improved method for forming at relatively low reaction temperatures thin films of compounds with perovskite structure having high dielectric constants. More particularly, this method involves the deposition of a perovskite film having two or more metal oxide constituents on a substrate by the simultaneous evaporation of these constituents. The evaporated constituents are deposited on the substrate in an oxygen atmosphere, a chemical reaction taking place between the constituents at temperatures as low as 550° C. due to the presence of the oxygen.

In accordance with my invention, the substrate on which the film is to be deposited is located within an evaporation chamber equipped with first and second electron beam emitters. First and second evaporation sources or targets are positioned in the chamber between the substrate and the first and second electron beam emitter respectively. The chamber is next evacuated, oxygen introduced into the chamber and the substrate heated. The first and second electron beams are then directed against the first and second targets respectively causing the materials comprising the targets to be simultaneously evaporated and deposited on the heated substrate where they react to form an oxide film.

As an example, barium titanate may be deposited on a substrate by employing a first target composed of barium oxide (BaO) and a second target composed of titanium dioxide ($TiO_2$). The oxygen pressure is in the range $10^{-4}$ to $10^{-1}$ millimeter of mercury and the substrate is heated to a temperature in the range 600 to 900° C. The density of the electron beams directed against the targets is adjusted to evaporate the target materials at an equal rate, the evaporated constituents then reacting on the substrate to form a thin film of barium titanate. The use of a relatively high oxygen pressure during the reaction makes it possible to reduce the substrate temperature to the lower end of the temperature range (i.e. 600 to 700° C.) thereby increasing the variety of substrate materials that can be employed. When electrodes are affixed to the surface of the resulting barium titanate film, a thin-film capacitor is obtained in which the barium titanate forms the dielectric.

The above objects of and the brief introduction to the present invention will be more fully understood and further objects and advantages will become apparent from a study of the following description in connection with the drawings, wherein.

Figure 1:
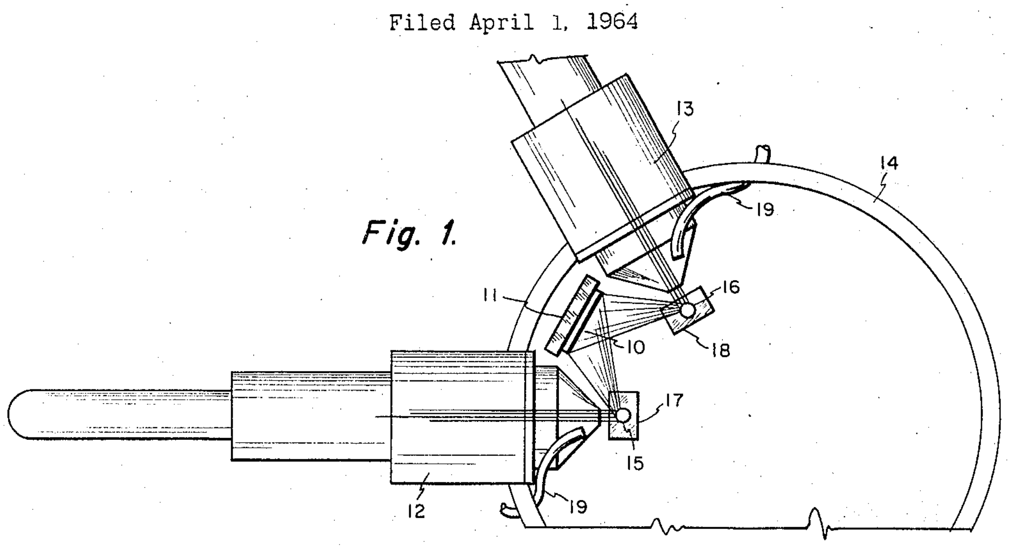
FIG. 1 is a plan view of the evaporation chamber and associated apparatus.
Figure 2:
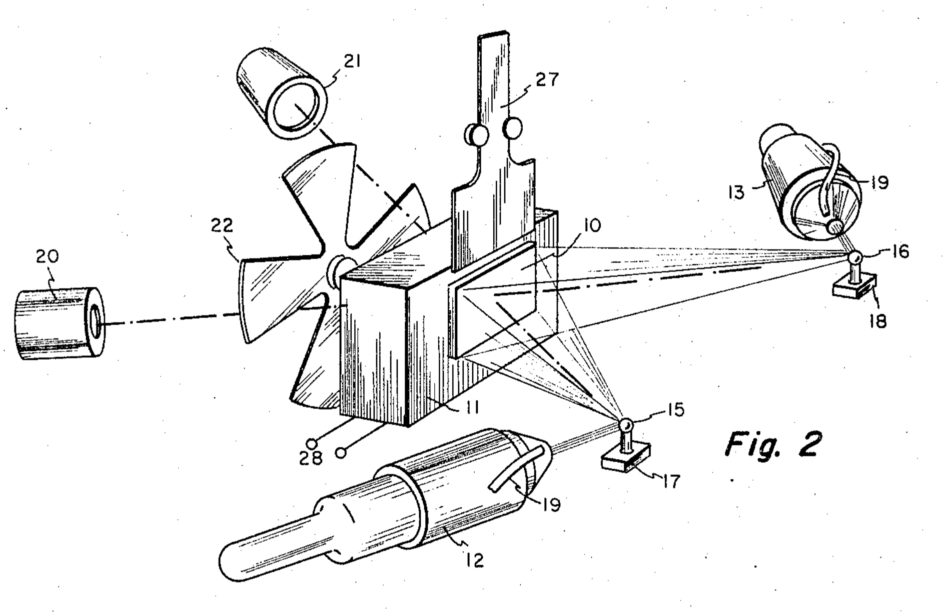
FIG. 2 is a perspective illustration showing in detail the substrate, targets and electron guns in the evaporation chamber.

Referring to FIGS. 1 and 2, a substrate 10 is mounted on a substrate holder 11 located between two electron guns 12 and 13 in an evaporation chamber consisting of a stainless steel container 14. Substrate 10 may be heated by applying a voltage to terminals 28, terminals 28 being connected to a heating coil (not shown) in holder 11. Targets 15 and 16 are supported by holders 17 and 18 and are movable in the vertical and in any preselected horizontal direction from outside the evaporation chamber. In this way, the targets can be precisely positioned in the beams and new material continuously brought into the beam as evaporation proceeds. Tubes 19 are provided for introducing oxygen into the evaporation chamber.

Evaporation rate monitors 20 and 21 (FIG. 2) employing a chopper 22 are located directly above substrate holder 11. These monitors may be of the type described by H. Schwarz in an article "Method of Measuring and Controlling Evaporation Rates During Production of Thin Films in Vacuum," Rev. Sci. Instr., 32, 194 (1961). In this instrument, a portion of the evaporant beam impinges on an ionization gauge after passing through the rotating chopper 22. The resulting alternating component of the gauge output current measures the evaporation rate independently of the direct current due to the background pressure.

Figure 3:
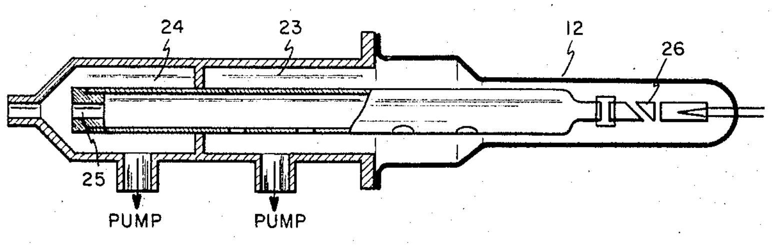
FIG. 3 shows details of the nozzles used in the apparatus of FIGS. 1 and 2.

The electron guns 12 and 13 are of conventional design except that, as shown in FIG. 3, the beam is passed through a pair of chambers 23 and 24 termed "dynamic pressure stages." These chambers, which are connected to each other by an orifice 25, are coupled to a vacuum pump which maintains stage 23 at the pressure surrounding the gun electrodes 26 ($10^{-5}$ to $10^{-6}$ millimeter of mercury) and maintains stage 24 at a pressure of $10^{-3}$ to $10^{-5}$ millimeter of mercury. In this way, the beam is brought from the extremely low pressure at the electrode structure 26 of the gun to the relatively higher pressure within the evaporation chamber 14 without danger of destruction of the gun cathode by ion bombardment. Further details regarding the dynamic pressure stages may be obtained from the publication B. Schumacher, Optik 10, 116 (1953).

The procedure for depositing a film of barium titanate on a substrate will be explained in detail although it shall be understood that this procedure may also be employed for depositing similar ferroelectric perovskite films having high dielectric constants such as lead titanate ($PbTiO_3$). The substrate 10, which may for example consist of an alloy of 60% platinum and 40% rhodium, is lapped, polished, degreased and placed in the substrate holder 11 where it is shielded by a shutter 27 (shown in its open position in FIG. 2). Barium oxide (BaO) and titanium dioxide ($TiO_2$) targets 15 and 16 are mounted in holders 17 and 18 respectively. Alternately, barium and titanium metals may be mounted in holders 17 and 18 and then converted to barium oxide and titanium dioxide by heating in the electron beams while jet streams of oxygen are directed against the targets.

After the substrate and targets have been mounted in the evaporation chamber, the pressure is reduced to about $10^{-5}$ millimeter of mercury and the substrate heated to a temperature in the range 600–900° C. for approximately twenty minutes to remove substantially all of the gas from the substrate and other heated parts. The system is then permitted to cool under the reduced pressure.

The substrate is then reheated to a temperature between 600–900° C. and the electron guns 12 and 13 energized to bring the targets to their evaporation temperature. Oxygen is admitted to the system and the pressure adjusted to a value in the range $10^{-4}$ to $10^{-1}$ millimeter of mercury. Shutter 27 is then lifted to the position shown and barium titanate deposited on substrate 10 at a rate of 2 to 8 Angstroms per second. The electron beams are adjusted to maintain equal evaporation rates of the barium oxide and titanium dioxide targets in order to obtain the unity stoichiometric barium-to-titanium ratio and prevent formation of compounds such as $Ba_2TiO_4$ and $BaTi_2O_5$. On completion of the evaporation, the electron guns and substrate heater are deenergized and the oxygen pressure maintained until the substrate has cooled below 600° C. The oxygen is then released from the chamber and the substrate permitted to cool at a pressure of $10^{-5}$ millimeter of mercury. The film thicknesses obtained are in the range 0.05 to 1 micron and the dielectric constants in the range 400 to 1500.

A typical barium titanate film having a thickness of 0.3 micron was prepared on a 60% platinum–40% rhodium substrate at an oxygen pressure of $10^{-3}$ millimeter mercury and a substrate temperature of about 950° C. A capacitor structure was formed by evaporating an aluminum electrode on the top surface of the film. The dielectric constant of the resulting capacitor was 1300 and its capacitance 4 microfarads per square centimeter.

As many changes could be made in the above construction and many different embodiments could be made without departing from the scope thereof, it is intended that all matter contained in the above description or shown in the accompanying drawings shall be interpreted as illustrative and not in a limiting sense.

What is claimed is:

1. A method for depositing a thin perovskite film having first and second metal oxide constituents on a substrate comprising the steps of (a) locating said substrate and first and second sources of said metal oxide constituents within an evaporation chamber,
(b) evacuating said chamber and then admitting oxygen thereto,
(c) heating said substrate, and
(d) directing first and second beams of electrons against said first and second metal oxide constituent sources thereby evaporating the constituents comprising said first and second sources, said first and second evaporated metal oxide constituents reacting on said heated substrate to form said thin perovskite film.

2. A method of forming a barium titanate film on a substrate comprising the steps of (a) locating said substrate, a source of barium oxide and a source of titanium dioxide within an evaporation chamber,
(b) evacuating said chamber and then admitting oxygen thereto,
(c) heating said substrate, and
(d) directing first and second beams of electrons against said sources of barium oxide and titanium dioxide thereby evaporating the barium oxide and titanium dioxide comprising said sources, said evaporated barium oxide and titanium dioxide reacting on said heated substrate to form said barium titanate film.

3. A method of forming a barium titanate film on a substrate comprising the steps of (a) locating said substrate, a source of barium oxide and a source of titanium dioxide within an evaporation chamber,
(b) evacuating said chamber and then admitting oxygen thereto, the oxygen pressure within said chamber being in the range $10^{-4}$ to $10^{-1}$ millimeter of mercury,
(c) heating said substrate to a temperature in the range 600 to 900° C., and
(d) directing first and second beams of electrons against said sources of barium oxide and titanium dioxide thereby evaporating the barium oxide and titanium dioxide comprising said sources, said evaporated barium oxide and titanium dioxide reacting on said heated substrate to form said barium titanate film.

4. A method for forming a barium titanate film on a substrate comprising the steps of (a) locating said substrate, a source of barium oxide and a source of titanium dioxide within an evaporation chamber,
(b) evacuating said chamber and then admitting oxygen thereto, the oxygen pressure within said chamber being in the range $10^{-4}$ to $10^{-1}$ millimeter of mercury,
(c) heating said substrate to a temperature in the range 600 to 900° C., and
(d) directing first and second electron beams against said sources of barium oxide and titanium dioxide, the densities of said first and second beams being adjusted to cause said barium oxide and titanium dioxide to evaporate at equal rates, said evaporated barium oxide and titanium dioxide reacting on said heated substrate to form said barium titanate film.

5. A method of forming a barium titanate film on a substrate comprising the steps of (a) locating said substrate, a source of barium oxide and a source of titanium dioxide within an evaporation chamber,
(b) reducing the pressure within said chamber to approximately $10^{-5}$ millimeter of mercury,
(c) heating said substrate to a temperature in the range 600 to 900° C. until substantially all of the gas is removed from said substrate and then permitting said substrate to cool at said reduced pressure,
(d) reheating said substrate to a temperature in the range 600 to 900° C.,
(e) directing first and second electron beams against said sources of barium oxide and titanium dioxide, the densities of said first and second beams being adjusted to cause said barium oxide and titanium dioxide to evaporate at equal rates,
(f) admitting oxygen into said chamber at a pressure in the range $10^{-4}$ to $10^{-1}$ millimeter of mercury, and
(g) reacting said barium oxide and titanium dioxide on said substrate to form said film of barium titanate.

6. A method for forming a barium titanate film on a substrate comprising the steps of (a) locating said substrate, a source of barium and a source of titanium within an evaporation chamber,
(b) evacuating said chamber and directing streams of oxygen against said sources of barium and titanium,
(c) heating said sources of barium and titanium by an electron beam to convert said barium and titanium to barium oxide and titanium dioxide respectively,
(d) heating said substrate to a temperature in the range 600 to 900° C., and
(e) directing said first and second electron beams against said sources of barium oxide and titanium dioxide thereby evaporating the barium oxide and titanium dioxide comprising said sources, said evaporated barium oxide and titanium dioxide reacting on said heated substrate to form said barium titanate film.

References Cited

UNITED STATES PATENTS

| | | | |
|---|---|---|---|
| 2,784,115 | 3/1957 | Brinsmaid et al. | 117—106 |
| 2,865,787 | 12/1958 | Risch | 117—106 X |
| 2,883,370 | 5/1959 | Damon et al. | 117—106 X |
| 3,034,924 | 5/1962 | Kraus et al. | 117—106 |
| 3,114,868 | 12/1963 | Feldman | 117—221 X |
| 3,271,179 | 9/1966 | Smith | 117—106 X |

OTHER REFERENCES

Holland: Vacuum Deposition of Thin Films, published by John Wiley & Sons, 1956, pages 466 to 469 and 498 to 502 relied on.

ALFRED L. LEAVITT, *Primary Examiner.*

A. GOLIAN, *Assistant Examiner.*